US006895373B2

(12) United States Patent
Garcia et al.

(10) Patent No.: US 6,895,373 B2
(45) Date of Patent: May 17, 2005

(54) UTILITY STATION AUTOMATED DESIGN SYSTEM AND METHOD

(75) Inventors: Gathen Garcia, Rio Rancho, NM (US); Gene Wolf, Albuquerque, NM (US); Chris Hickman, Los Lunas, NM (US)

(73) Assignee: Public Service Company of New Mexico, Albuquerque, NM (US)

( * ) Notice: Subject to any disclaimer, the term of this patent is extended or adjusted under 35 U.S.C. 154(b) by 250 days.

(21) Appl. No.: 09/984,374

(22) Filed: Oct. 30, 2001

(65) Prior Publication Data

US 2002/0042696 A1 Apr. 11, 2002

Related U.S. Application Data

(63) Continuation of application No. 09/545,455, filed on Apr. 7, 2000.
(60) Provisional application No. 60/128,560, filed on Apr. 9, 1999.

(51) Int. Cl.[7] ................................................. G06G 7/54
(52) U.S. Cl. ...................... 703/18; 361/39; 707/103 R; 716/8
(58) Field of Search ............................ 703/18; 361/39; 707/103 R; 716/8

(56) References Cited

U.S. PATENT DOCUMENTS 4,360,849 A  * 11/1982 Harris et al. ................... 361/39
5,764,533 A  * 6/1998 deDood ............................ 716/8
6,038,567 A  * 3/2000 Young ....................... 707/103 R

OTHER PUBLICATIONS

"AutoCAD and its applications Advanced Release 14", by Terence M. Shumaker et al., The Goodheart–Willcox Company, Inc., May 1998, pp. 3, 88, 145, 177, 245, 255, 323, 348, 369–371, 386, 389, 473, 477, 478, 481, 486, 487, 535, and 547.*

The Computerized Society (Understanding Computers series) by Time–Life Books, 1986, ISBN 0–8094–5721–0, pp. 53–63, 92–97, and 113–121.*

* cited by examiner

Primary Examiner—William Thomson
Assistant Examiner—Ed Garcia-Otero
(74) Attorney, Agent, or Firm—Oblon, Spivak, McClelland, Maier & Neustadt, P.C.

(57) ABSTRACT

A system and method provide a computer-based automated tool for quickly and efficiently designing utility stations. One example of such a utility station is a unit substation. The tool includes a database of user-selective predrawn symbols that are associated with a pre-defined and stored station template. Each of the respective symbols have associated therewith attributes that are computer recognizable as being attributes associated with the respective symbols, and may be combined into a list, when the symbols are selected for use with the station. The tool presents a graphical rendering of the symbols arranged on the station, after the respective symbols have been identified.

58 Claims, 13 Drawing Sheets

Estimate Dialogue Box

Project Name: _____

Const Start Date (mm/yyyy): _____

CAD File (8 characters): _____

Out of Town
- ○ Yes
- ○ No

Design Placement
- ○ SINGLE UNIT DESIGN - LEFT
- ○ SINGLE UNIT DESIGN - RIGHT
- ○ TWO UNIT DESIGN
- ☐ 115kV Breaks

Top Rated MVA
- ○ 1 4 MVA
- ○ 2 2.4 MVA
- ○ 3 3.6 MVA
- ☐ Other

Grd Grid Spacing
- ○ 5ft.
- ○ 10ft.
- ○ 15ft.
- ○ 20ft.

Wall Hgt
- ○ 12'
- ○ 14'
- ○ CLink

| | | |
|---|---|---|
| ○ 0 | ○ 0 | ○ 0 |
| ○ 1 | ○ 1 | ○ 1 |
| ○ 2 | ○ 2 | ○ 2 |
| ○ 3 | ○ 3 | ○ 3 |

[ OK ]   [ Cancel ]

*FIG. 10A*

UTILITY STATION AUTOMATED DESIGN SYSTEM AND METHOD

CROSS-REFERENCES TO RELATED APPLICATION

This application is a continuation of 09/545,455 filed on Apr. 7, 2000, and claims the benefit of the earlier filing date of, U.S. Provisional patent application Ser. No. 60/128,560, filed Apr. 9, 1999, entitled "Utility Station Automated Design System and Method," the entirety of which is incorporated herein by reference.

BACKGROUND OF THE INVENTION

1. Field of the Invention

The present invention pertains to automated design systems and methods for planning and designing utility stations. More particularly, the present invention relates to automated design systems, methods and computer program product, for designing, and estimating materials and costs for utility stations, such as a unit substation or other component of a public utility system, such as an electric power generation, transmission and distribution system.

2. Discussion of the Background

In 1999, a typical unit substation design and development project costs approximately 1 million dollars and takes roughly one year from conception to completion. The typical process begins with an engineer who prepares a sketch of the substation, and sends the sketch to a drafting area, where a draftsperson takes the sketch, along with associated notes prepared by the engineer, and develops a working construction set (i.e., a set of drawings with associated symbols and notes). The draftsperson then gives a draft construction set to the engineer for review. At this time, during the review, the engineer would either modify the construction set, or add additional information to the construction set and then send the modified construction set back to the draftsperson for redrafting to incorporate the changes. The draftsperson completes the changes and sends the changes back to the engineer. This iterative process can repeat as many as four or more times. Once the construction set is finalized, roughly three or more months have expired since the initiation of the project.

As presently recognized by the inventors, the conventional design process presumes that every unit substation has to be redesigned by the engineer, even though approximately 90% of the components are the same between substations. In this way, the engineer has to address each component of the system, even though the engineer may have already done similar work on previous projects. After the initial design is done, the engineer then prepares a materials list of the components and prepares a cost estimate.

Regarding how the details are developed in the drawings, the Engineer is provided with a "one line diagram" from a planning department and includes an electrical representation of the symbols for each device to be included in the substation. Conventionally, draftspeople use CAD (computer aided design) programs, like AutoCAD, a draftsperson oriented program. The draftsperson then draws the component parts of the system using the CAD program. After a CAD drawing has been prepared, the engineer will provide the CAD drawing to the planning department, who at that time may decide to further modify the substation, so as to change components required therein, or change the system performance to meet perceived customer demands. If the planning department does change the drawings, another engineering and drafting operation is required in order to produce a final set of construction drawings.

These construction drawings are detail oriented, such that the drawings may be provided to a contractor for building the substation. For example, the construction drawings will have detailed features, such as conduit placement, foundation placement and grounding placement. The drawings also show the connections amongst the different subcomponents used in the substation. These connections can be very detailed, perhaps showing a small connector fitting between pieces of bus lines. This detail may become very cumbersome because a unit substation may have between two and three hundred electrical connectors. Furthermore, the unit substation may have three to four hundred feet of aluminum bus infrastructure, a couple thousand feet of copper in the ground, and on the order of 20 to 50 foundations. After the drawings are complete, the engineer then uses the drawings to fill out a materials list for the equipment to be ordered. Generally, it is a time consuming process for the engineer to scrutinize the different components on the drawing and list the same on a materials list.

As recognized by the present inventors, the iterative process between the engineer and the draftsperson is a time consuming process, and an expensive procedure for designing substations. The conventional process presumes that each substation has different characteristics that mandate the use of a significant amount of engineering, as well as draftspersons' time in order to properly design the substation. However, as presently recognized, there can be a significant amount of redundancy between respective substations, that if, properly characterized could be an advantage in streamlining the design process.

Another limitation with the conventional practice, is that the iterative design process is prone to error, based on the number of different people involved in the process. Furthermore, because each substation is custom designed, it is more difficult for planning departments, as well as contractors who will build the substation to interpret the drawings because each set of construction plans differs from one substation to the next.

SUMMARY OF THE INVENTION

Accordingly, one object of the present invention is to address the above-described limitations of existing systems and methods. While the present section of this document is directed to a summary of the invention, a limited number of attributes associated with the present invention are described herein. However, a more complete description is provided in the section entitled "Detailed Description of the Preferred Embodiments".

The present invention is directed to a utility station automated design system and method that allows an engineer to design a unit substation, or other utility station, as well as prepare a materials list and cost estimate, in several hours, rather than several months, as is the case with conventional design practices. A feature of the present invention, is a computer-based tool having a database that holds both standard "substation templates", as well as equipment "symbols" that may be applied to one another, as selected by a user, via a graphical user interface to produce a 3D drawing set. The user is presented with a series of options that are logically arranged so as to guide the user through the process of designing the unit substation, using the symbols and templates, as selected by the user. Moreover, the user is requested to select a predetermined "standard" substation architecture, and once selected, the user is presented with a series of options regarding which components are to be included within the standard configuration. Once selected, symbols associated with the selected components, are selected by the user from a database, and overlaid in layers with the assistance of a computer aided drawing package. In this way, the symbols are arranged and presented on a display, or printed as a set of construction drawings, so that an overall unit substation system may be designed in a relatively short period of time. Subsequently, the user may be requested to identify whether the user would like to modify the existing design, or prepare a list of building materials and cost estimates associated with the respective components in the unit substation, or other utility station.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 10A–10B are respective display screens, showing different user-selectable components for inclusion in a substation.

DETAILED DESCRIPTION OF THE PREFERRED EMBODIMENTS

Figure 1:
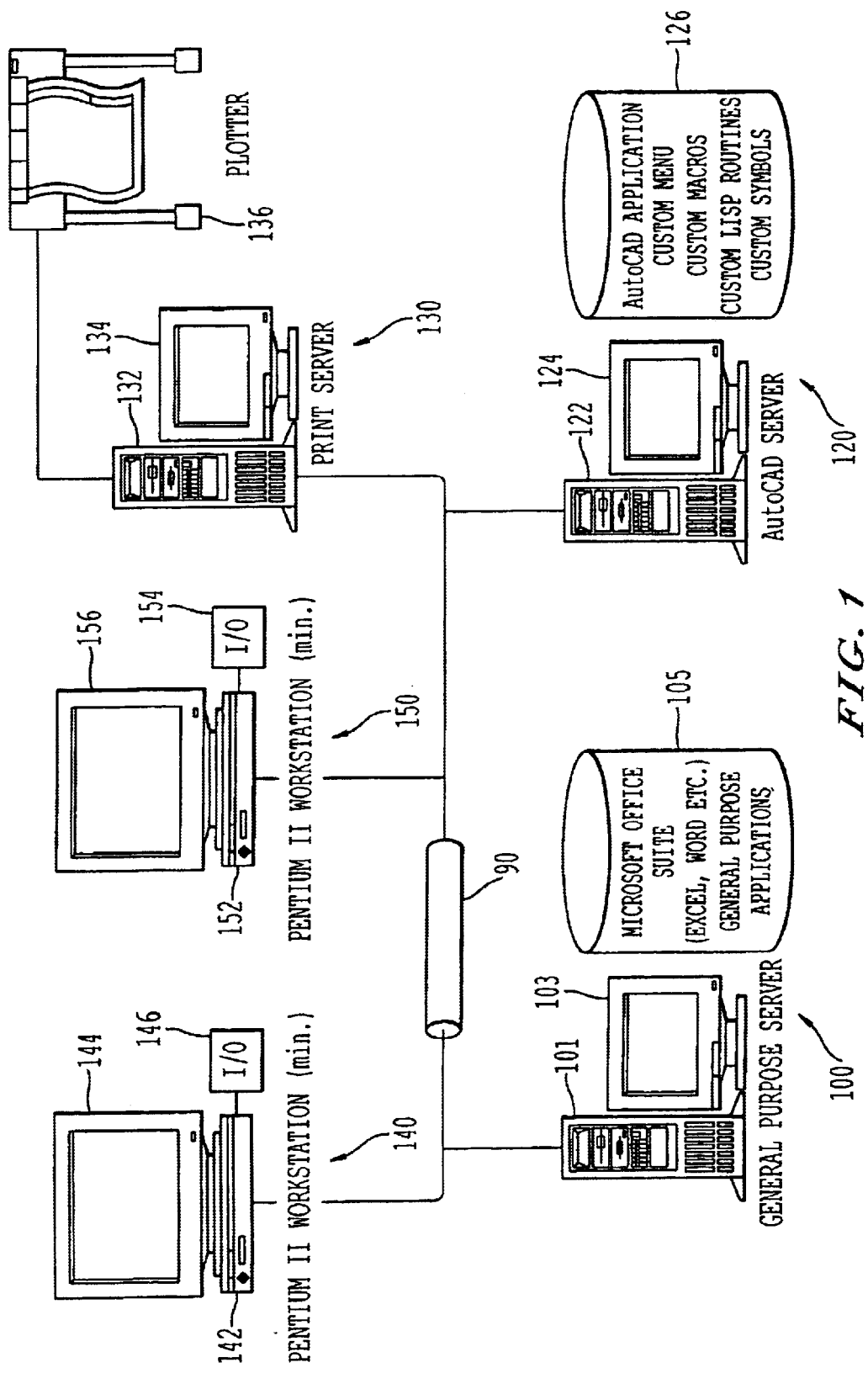
FIG. 1 is a block diagram of a computer network according to the present invention, that interconnects a user terminal, with a print server, and database server.

Referring now to the drawings, wherein like reference numerals designate identical or corresponding parts throughout the several views, and more particularly to FIG. 1 thereof, there is illustrated a utility station automated design system configured to allow a user to design a utility station, such as a unit substation, and prepare a drawing construction set, as well as a cost estimate and materials list.

Although the present invention is discussed with respect to design of a utility station, the approach, as recognized by one of ordinary skill in the relevant art, is applicable to other types of facilities, including water facilities as well as gas facilities. For example, the water facilities encompass wells/well houses, pump stations, lift stations, pressure regulator stations, complex piping arrangements, small to moderately sized water and wastewater treatment plants and site layouts, and tank sites. The gas facilities can be categorized as follows: transmission facilities, distribution facilities, and production and gathering facilities. These three types of gas facilities involve interconnects with other pipeline companies' facilities, regulator (pressure reducing) stations, metering stations (e.g., delivery stations, border stations, and check meters), pressure and flow monitoring equipment, valve stations, and, compressor stations.

Before turning to the specific features contained within FIG. 1, an overview of a method and system implemented by the present invention is in order. The present invention was made in recognition of efficiency limitations with the conventional substation design processes employed in the utilities industry, where significant design times are expected for preparing unit substations (or other components of a public utility). Conventionally, significant amounts of time are allocated for a CAD manager and senior engineers, regarding preparation of construction sets (drawing packages that describe the unit substation). One of the limitations with the conventional approach was determined to be that each CAD operator had a different skill level and different ideas regarding how particular drawings should be laid out. This lack of uniformity regarding how the CAD operators interpreted the information provided by the engineers, resulted in inconsistent system configurations, and inefficient, iterative communications between the CAD operator and the engineer.

In light of such problems, the present inventors determined that it was possible to use AutoLISP routines that would be used to prepare menus to import different information regarding company information and like into the drawing set. For example, a feature of the invention is to use a AutoLISP routine to provide on a pull down menu, such as the size of the drawings, such as "A", "B", . . . , or the drawing scale. This routine also sets line types, text, layering, line widths and the like, so that respective drawing sets from a particular company, will be uniform in appearance.

Aside from importing corporate information into a particular drawing, the present inventors also determined that it would be advantageous and commercially efficient to prepare pre-approved two-dimension (2-D) symbols, or 3-D symbols as will be discussed, for an entire station of equipment, complete with foundations, conduits, and grounding at all voltage levels used by the corporation. Through the use of layer control in AutoCAD, each of the pre-approved and stored equipment symbols are placed in an equipment layer, the foundation symbols to be placed in a foundation layer and so on. In this way, symbols can be associated with a particular drawing, thereby allowing the user of the system to automatically specify the symbols (and the components associated therewith) to be automatically retrieved and overlaid on the drawing. In this way, when construction drawings are prepared, where construction drawings include a plan view, section view, conduit plan, grounding plan, foundation plan and the like, depending on the drawing type selected, the AutoLISP routine turns layers off and on until only the foundations are visible, if the foundation plan is the one that is to be displayed. Dimensioning work for the respective components shown in the drawing is done automatically with AutoCAD.

In an alternative embodiment, pre-approved and pre-drawn 3-D symbols are a substitute for, or are used with 2-D symbols. Using 3-D symbols, allows for not only perspective view, but also allows a user to change the viewer's reference point in 3-D. Furthermore, a 3-D model is automatically produced which is capable of being rendered. The 3-D renderings produced with the 3-D model can be used in governmental permit hearings. Typically, such work cannot be produced in the typical CAD facility, but rather are provided to an outside drafting firm, with both cost and time penalties associated therewith.

By saving the respective symbols in a library, accessible to different users, by way of the computer network, users may extract the respective symbols when designing a unit substation. So as to avoid having the end user, perhaps an engineer, become familiar with 3-D design practices, the present invention incorporates dialog boxes, hierarchically arranged, and AutoLISP routines that allow the user to design a 3-D structure from a plan view. In this way, the user can design the system, by providing only minimal information, regarding the size of the bus, bus spacing and the like, and the AutoLISP routine makes the additions to the drawing on the correct layers at the correct heights as a 3-D, custom model would do.

In view of the present inventors' observations, much of the structure within a substation is, or at least could be, reused. The present inventors determined that aside from symbols, substation-level templates, (i.e., pre-approved substation layouts) may be used to preposition respective components within the substation. In this way, the engineer need not spend time positioning respective components, but rather needs to only select symbols, and have the symbols automatically placed in the pre-approved locations.

One feature of using components as part of a standardization design process, is to standardize different sizes of transformers to predetermined set levels. For example, in a preferred embodiment, three different top-ratings of transformers are used: 14 MVA, 22 MVA, and 33 MVA. Other ratings may be used as well. Furthermore, the standard unit substation also includes one of four types of switch gear: 2 feeder, 3 feeder, 4 feeder, and stations with a main breaker. To this end, in the preferred embodiment, different unit substation "templates" include three standard layouts, referred to herein as "single unit-right", "single unit-left", and "two unit designs". Other standard layouts may be used as well, as will be appreciated by one of ordinary skill in the substation design art, based on the description contained herein.

An advantage of the present invention is that the respective symbols used within the substations have associated therewith different attributes which are stored in memory. These attributes are associated with symbols by file name, for example, and stored in one or both of ACCESS data files, and EXCEL spread sheets, where both ACCESS and EXCEL are available through Microsoft Corporation.

Using the system and method described herein, an engineer can produce a construction set of a unit substation in approximately 3 hours. The engineer reviews a description of the substation provided by a planning department and then initiates an AutoCAD session. The engineer then selects the type of drawing from the pull down menu presented on a display screen. Subsequently the engineer selects a type of station to be designed, such as a new 115 kV unit substation. Other types of stations or other differently rated substations may be designed as well. After selecting the type of substation, the engineer is presented with a series of dialog boxes, logically arranged in sequence, for presenting choices regarding the components to be used in the overall system. The engineer responds to the respective prompts, and the responses are saved in memory. Once all the entries are complete, the engineer executes a compilation routine by acknowledging the engineer has made all of the selections, and AutoCAD begins to draw the station, by retrieving the pre-drawn symbols from a library and applying the respective symbols to the selected pre-designed substation template. Subsequently, the engineer can request, or as an alternative the request may be automatically produced, to provide a cost and estimate materials list for the materials needed for the construction of the unit substation. Thus, rather than taking three months or more to produce the construction set, the engineer can complete the job, reliably and efficiently in approximately three hours.

Turning to FIG. 1, FIG. 1 is a block diagram of a utility station automated design system according to the present invention. In particular, a network 90 is included, such as an Ethernet, FDDI network, Intranet or Extranet, at least a portion of which may be an Internet connection or a public switch telephone network (PSTN) connection. The network 90 allows a general purpose server 100, as well as an AutoCAD server 120 and a print server 133 to communicate with different user stations 140 and 150. The general purpose server 100 includes a memory 105 that hosts application software, such as EXCEL, ACCESS and the like. The application software hosted on the memory 105, is accessible via the network 90 by each of the user terminals 140 and 150. The general purpose server 100 also includes a monitor 103 and computer 101, with a CPU, internal memory, peripheral devices, internal communication bus, RAM and ROM memory, and the like contained therein.

The AutoCAD server 120 includes a memory 126 that includes the AutoCAD application, custom menu structure, custom macros, custom list routines and custom symbols, as were discussed above. Information produced at the computer 122 may be viewed on the display 124, or alternatively other information provided via the computer 122 is viewed on the display 124. The print sever 130 includes its own computer 132, and display 134. The computer 132 contains a communication mechanism that communicates over the network 90 so that information may be passed to a plotter 136 for producing hardcopies of drawings sets. User workstation 140 includes a computer 142 and monitor 144, where the computer 142 communicates via an input/output (10) device 146 for communicating with external devices. The external devices may be remote terminals, or even local peripherals, such as a mouse, keyboard, external memory and an interface for loading symbols if necessary and the like. Similarly, user terminal 150 includes a computer 152, monitor 156, and I/O device 154.

As part of the AutoCAD server memory 126, the present invention includes a database of custom symbols, where each of the symbols are 3-D drawing files of components used in a unit substation. Held in the ACCESS database and/or EXCEL spreadsheet in memory 105, are attributes that are associated with the custom symbols held in the database of symbols in the memory 126. In addition, AutoLISP routines perform the functional operations interfacing function for communicating with AutoCAD, and thus perform the separate processing steps described herein. These AutoLISP routines are also contained in the memory 126. Furthermore, both the menu arrangement as presently discussed herein, as well as macros, that help to assist in performing routine repetitive operations are also stored in the memory 126.

Typically, a user will design a substation from one of the user terminals 140 or 150. In the embodiment described in FIG. 1, the user terminal retrieves the information from the general purpose server 100, and AutoCAD server 120 as required. Alternatively, all of the components and software may be contained on one workstation or computer, so that no network is required and all work may be performed locally. As a further alternative, additional external computing devices may be used as well to perform some or all of the computations and routing of information. In these cases, external communication links, such as through the public switch telephone network, Internet, or even proprietary wireless and wired links may be used as well.

The AutoCAD application included in the memory 126, may be AutoCAD 2000, although other versions of AutoCAD may be used as well, such as AutoCAD release 14, the on-line help section documentation for which is incorporated herein by reference.

Figure 2:
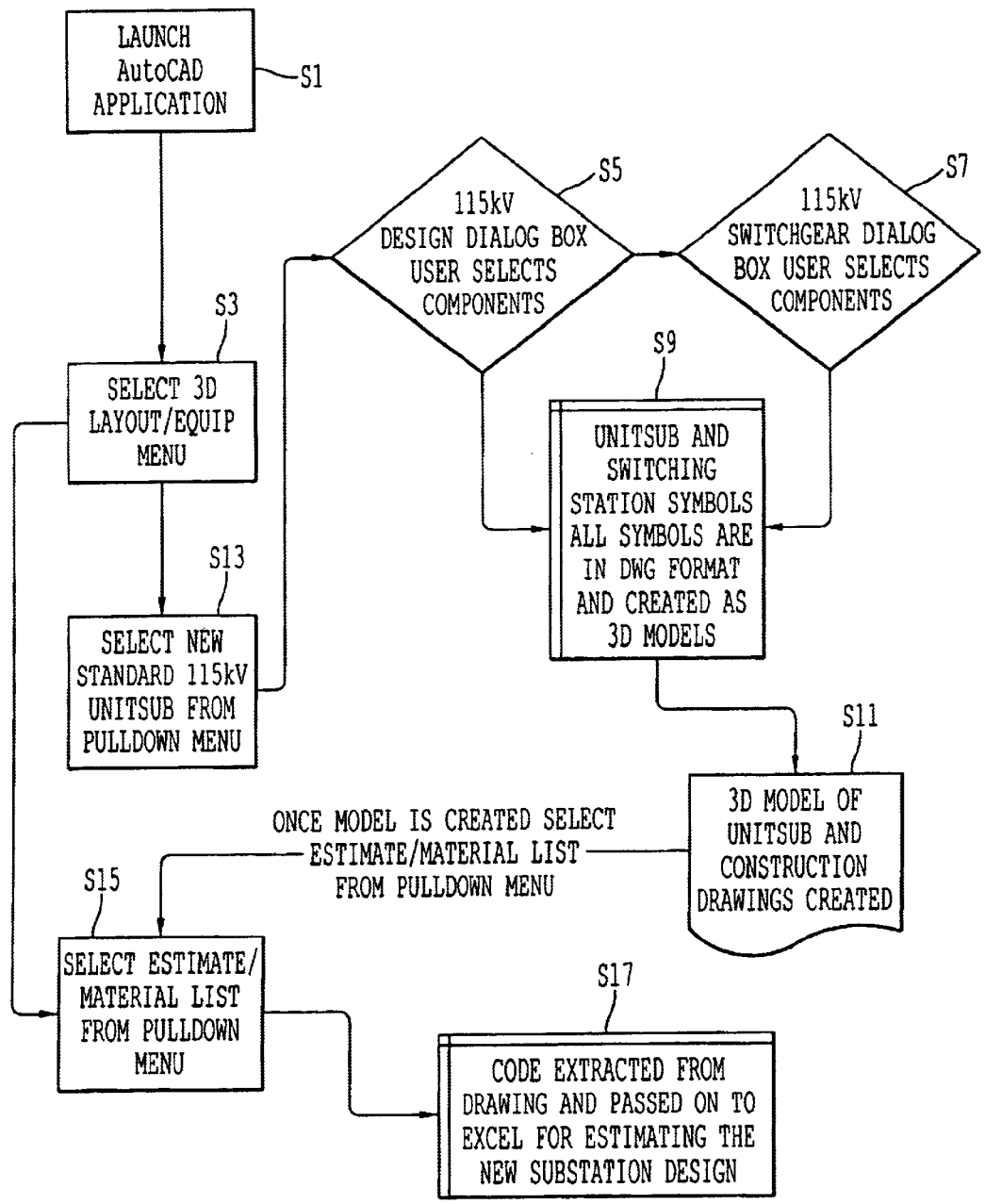
FIG. 2 is a flow chart of a process flow for designing a new 115 kV unit substation.

FIG. 2 is a flowchart, showing a process according to the present invention for designing a new unit substation. The process flow shown in FIG. 2, corresponds with the top horizontal row of operations shown in FIG. 4, as will be discussed later. In FIG. 2, the process begins in step S1, where the user launches the AutoCAD application. The process then proceeds to step S3, where the user selects, via a pull-down menu, that the user would like to implement a 3-D layout/equipment operation. In step S3, the user may then use sub-menus to select a new standard 115 kV unit substation from a pull-down menu, as shown in Step S13. On the other hand, also shown in the pull-down menu, is the option for the user to select an estimate/material list operation from a pull-down menu in step S15. Each of these steps will be discussed in more detail below.

If the user selects to design a new standard 115 kV unit substation, or other station as preprogrammed into a set of templates, the user selects this option. The process then flows to step S5, where the user is presented with a design dialog box associated with a "template" 115 kV unit substation. An example of the dialog box is shown in FIG. 10A where a series of information prompts is presented for the user to select components of the 115 kV design. Each of the respective selections are shown in FIG. 10A. Before entering the details of the 115 kV design, the respective voltages used, in a preferred embodiment are discussed herein.

At a generation plant in the U.S., generators typically generate approximately 22,000 volts. This voltage is then stepped up to approximately 345,000 volts for cross-country transmission. This high voltage is used in order to minimize resistive losses. However, the 345 kV is too high for use in end use applications, and therefore the voltage is stepped down to 115,000 volts in some cases, where the 115,000, as well as the 345,000 volts are all three phase voltages. The unit substation converts the voltage from 115 kV down to 12,470 volts. The 12,470 volts then is distributed around cities and the like and connects to transformers that hang on utility poles in residential areas, for example. It is these transformers that converts the electrical power down to the 120–240 volts used in the United States and typical applications. While the present discussion has been directed towards power distribution in the United States, the particular numbers herein, may be adjusted for use in other countries around the world.

Returning to FIG. 10A, the engineer after identifying the project name and other information associated with the project, selects a template regarding the type of substation selected. The type of substation may either be a single unit design-left, single unit design-right, two unit design, or a unit designed with a 115 kV breaker. Other templates describing other arrangements may be used as well. After selecting the substation template, the engineer may then select the top rated MVA, a measure of apparent power.

The engineer then selects the ground grid spacing, from a predetermined set of spacings, as shown. Subsequently, the engineer selects the wall height surrounding the substation, swing grill, fixed grill, and mandoors. After all the selections are made, the operator clicks the "OK" button to complete the selections. Once clicked, the selections are saved in memory.

Figure 10B:
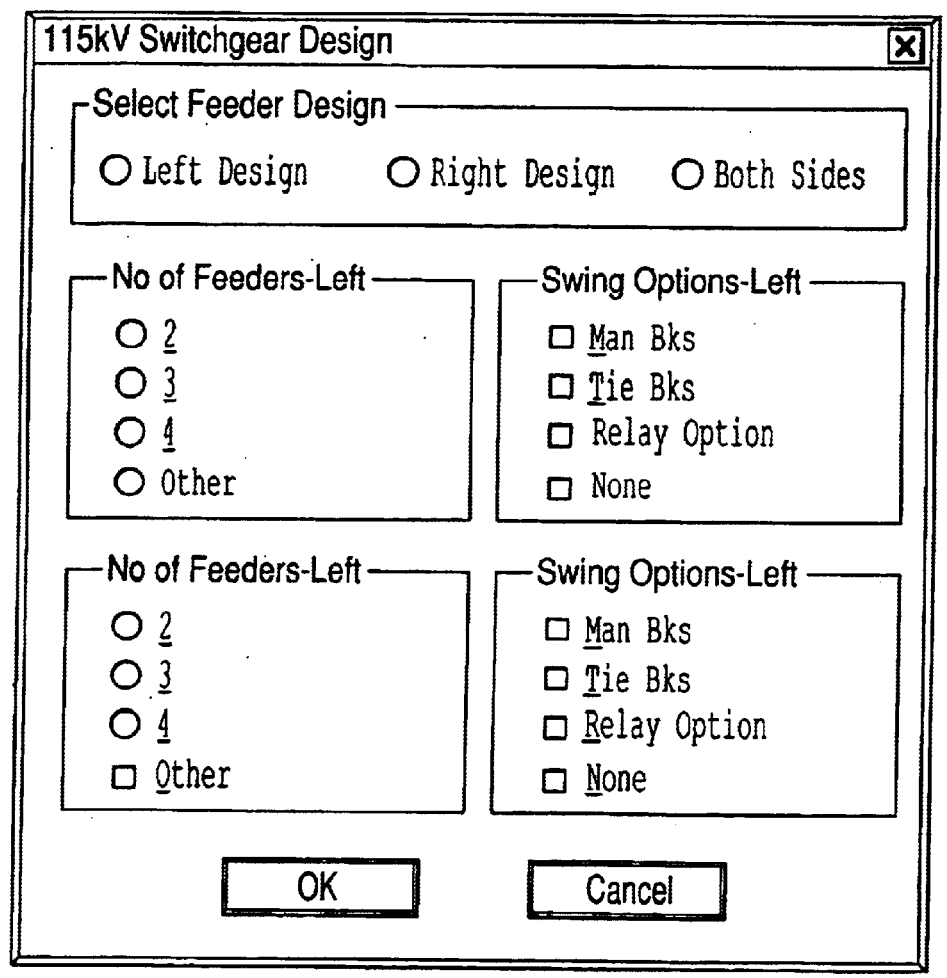

The above discussion was directed to step S5 in FIG. 2, and after this step, the process proceeds to step S7 if the user desires to make design selections for the switch gear associated with the substation. The reason why the switch gear is made into a separate dialog box, is that the switch gear may have some unique features in it depending on the operational goals of the substation. Accordingly, standardization of the substation is made separate from that of the switch gear, so as to maximize the flexibility for the engineer when designing the substation. Switch gear selections may also be incorporated into the substation component selections. An example of the dialog box which is displayed in step S7 is shown in FIG. 10B. In FIG. 10B, the different number of feeders, shown in left and right configurations, are provided as well as the switching gear options as shown. While the number of feeders is shown to be 2, 3 or 4, it is possible also to include a greater number of feeders, such as for a 30 MVA system. Greater or lesser number of feeders than that displayed are available for use in the present invention. After the user has selected all the options in FIG. 10B, the user clicks the "OK" button and the process proceeds to step S9 in FIG. 2.

Switch gear is a disconnecting device and a metering device. Power is brought in from the transformer into the switch gear and then has feeders that extend therefrom into separate circuits. Disconnecting devices, such as circuit breakers, are included on each circuit. In this way, it is known how much power is being used on each of the feeders, by way of the meter. Each of the circuits are thus separately protected and this control and monitoring of the respective circuits may occur independently, so that if lightening, for example, were to hit one of the feeders, then that event would be detected and the feeder may be disconnected without damaging the other feeders.

Information that is input by the engineers in the respective dialog boxes is collected by way of a AutoLISP routine that takes the respective choices, compiles the choices and takes the compilation of choices to an associative mechanism, that retrieves respective symbols from the symbol library in the memory 126 for retrieval. Once the symbols are retrieved, the symbols are then overlayed in a drawing, as is the case in step S9 as shown in FIG. 2.

In FIG. 2, after step S9, the process proceeds to step S11, where a 3-D model of the unit substation and construction drawings are created and printed out, based upon whether the user selects to create the hard copy of the drawings at that time. The hard copies are printed by way of the print server 130 on the plotter 136 of FIG. 1. The drawings may also be sent electronically to a remote location, such as a government facility for review and approval.

In FIG. 2, once the drawing set has been created, the operator has the choice of proceeding to step S15, from S11. Alternatively, the operator may proceed directly to step S15, by way of step S3 as previously discussed. In step S15, the user selects from a pull-down menu the estimate/materials list operation. When selected, another AutoLISP routine extracts the attributes associated with the selected symbols from the ACCESS database. In this way, the attribute information may be sent to a template file for presentation to the end user in a materials list. Another AutoLISP routine takes the information that has been extracted, launches the EXCEL program and passes the information in a text file that has been taken from AutoCAD to EXCEL where the template accepts the information and presents it in an EXCEL compatible format. When extracting the information, the attribute information that was taken from AutoCAD perhaps may be representative of multiple components, but the template recognizes the multiple components as a group, and therefore can present the materials list and cost estimate in a cohesive manner. Thus, extraction involves an identification of the components and then based on the components identified, the attribute information associated with those components is retrieved, as previously stored in ACCESS or even EXCEL. This code extraction process is shown as step S17 in FIG. 2. The output of step S17 is a hard copy of an equipment list and cost estimate, based on the different components included in the substation, as designed.

Figure 3:
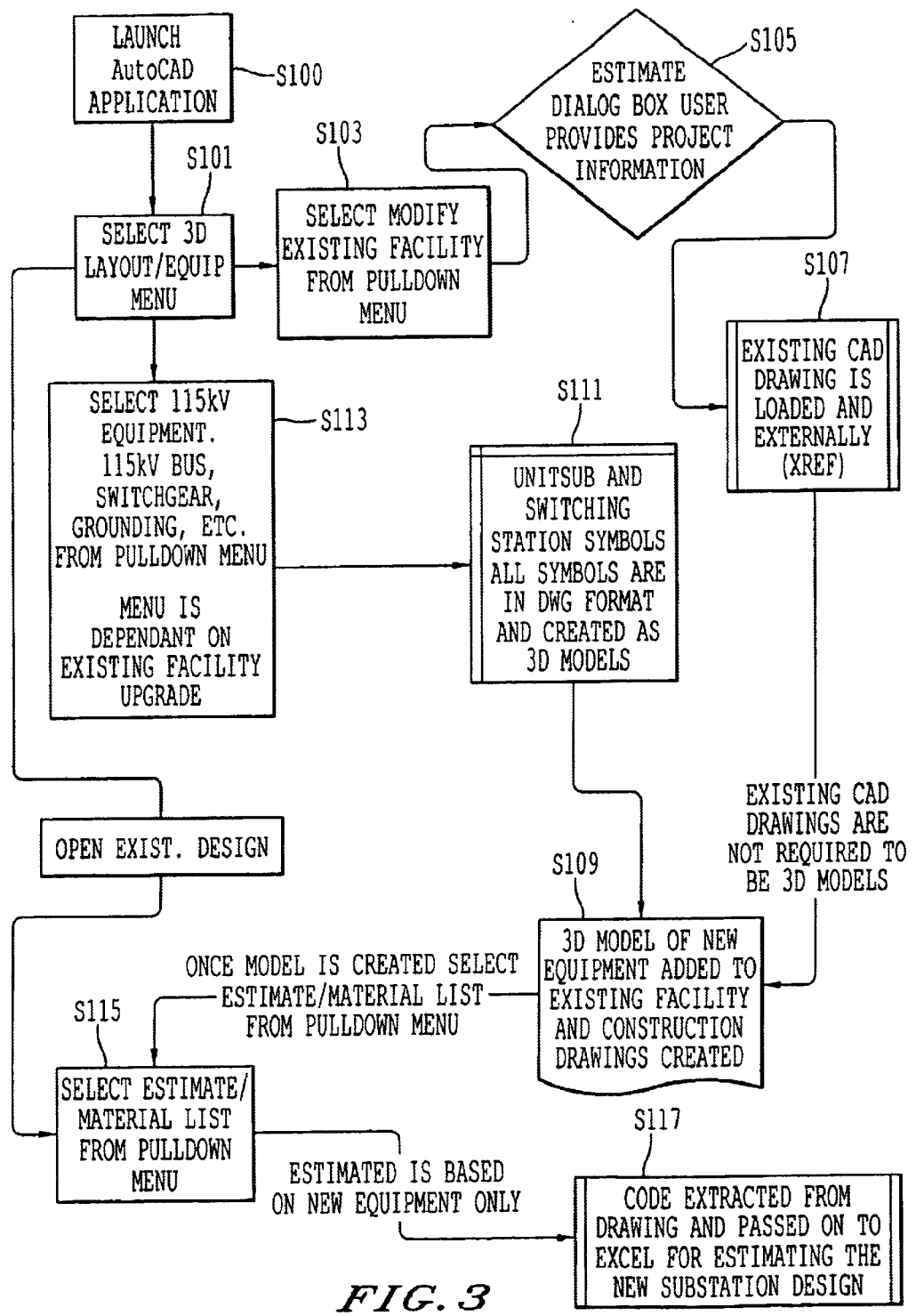
FIG. 3 is a flow chart of a process flow for modifying an existing substation facility.

FIG. 3 is a flowchart describing a method for automatically modifying a pre-existing utility station, such as a substation. The process begins in step S100 where the AutoCAD application is launched. The process then proceeds to step S101 where a selectable menu presents options for modifying an existing facility (step S103), or for selecting 115 kV equipment from a particular pull-down menu, as indicated in step S113. If the user elects the path of the step S103, the process then proceeds to step S105, where the user is presented with a dialog box requesting information regarding the pre-existing drawing set to be modified. The process subsequently proceeds to step S107, where the existing AutoCAD drawing is located and loaded externally as an XREF, an externally referenced file. This XREF file may not be modified, but new components may be added thereto. The process then proceeds to step S109, where the drawing set is created. If however, the operator selects the path of S113, after performing step S101, the process proceeds to allow selection or modification of unit and sub-switching station symbols according to modifications made by the user. The process then proceeds to step S109, discussed above.

From either step S101 directly, or from step S109, the process proceeds to step S115 and then step S117, which performs similar operations to those described in step S15 and step S17 of FIG. 2. Subsequently, the user has the option of making a hard copy of the drawing set.

Figure 4A:
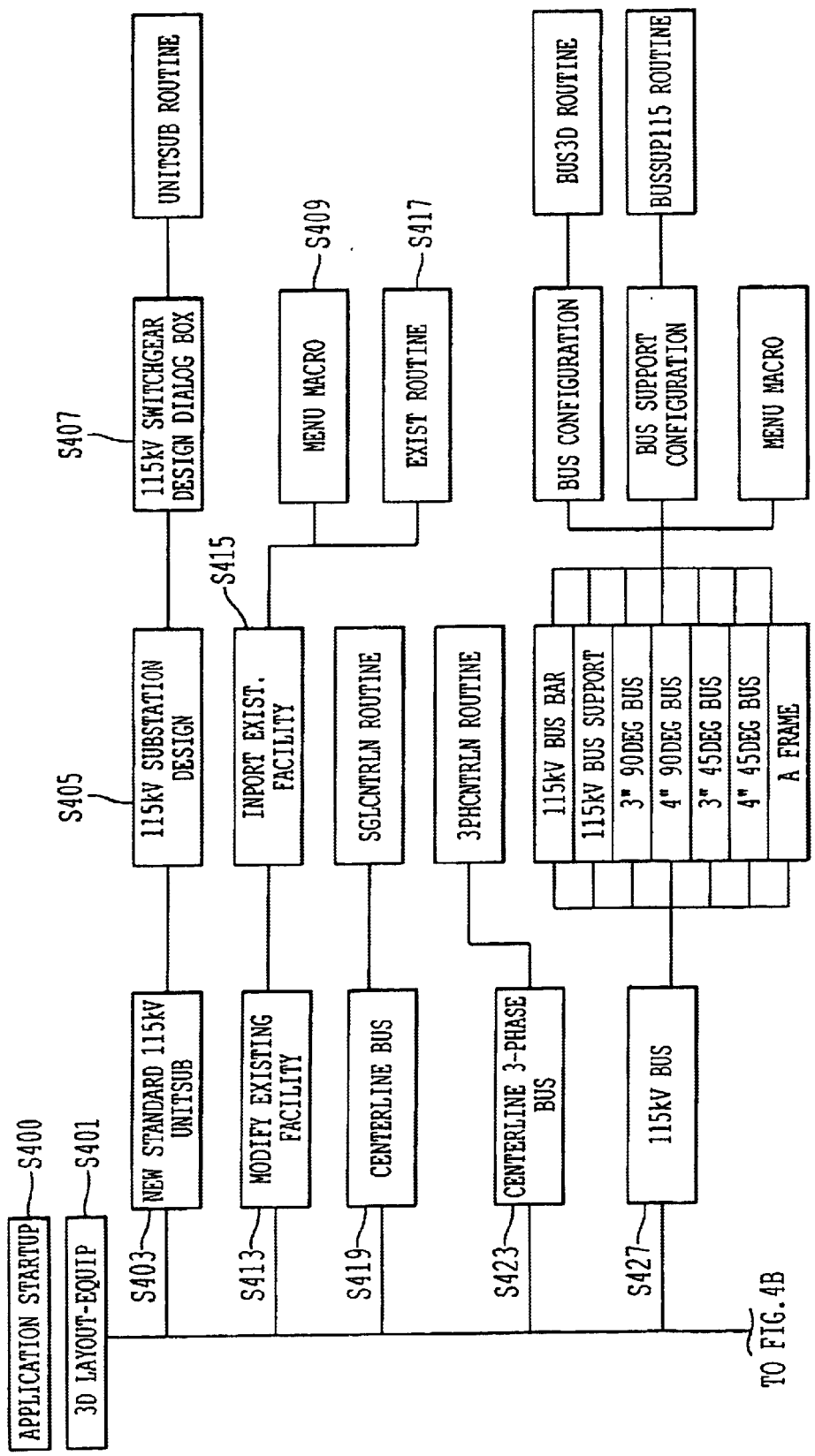
FIGS. 4A–4C are a flow chart, showing a logical process flow, for either designing a new substation, modifying an existing facility, or preparing an estimate/material list.
Figure 4B:
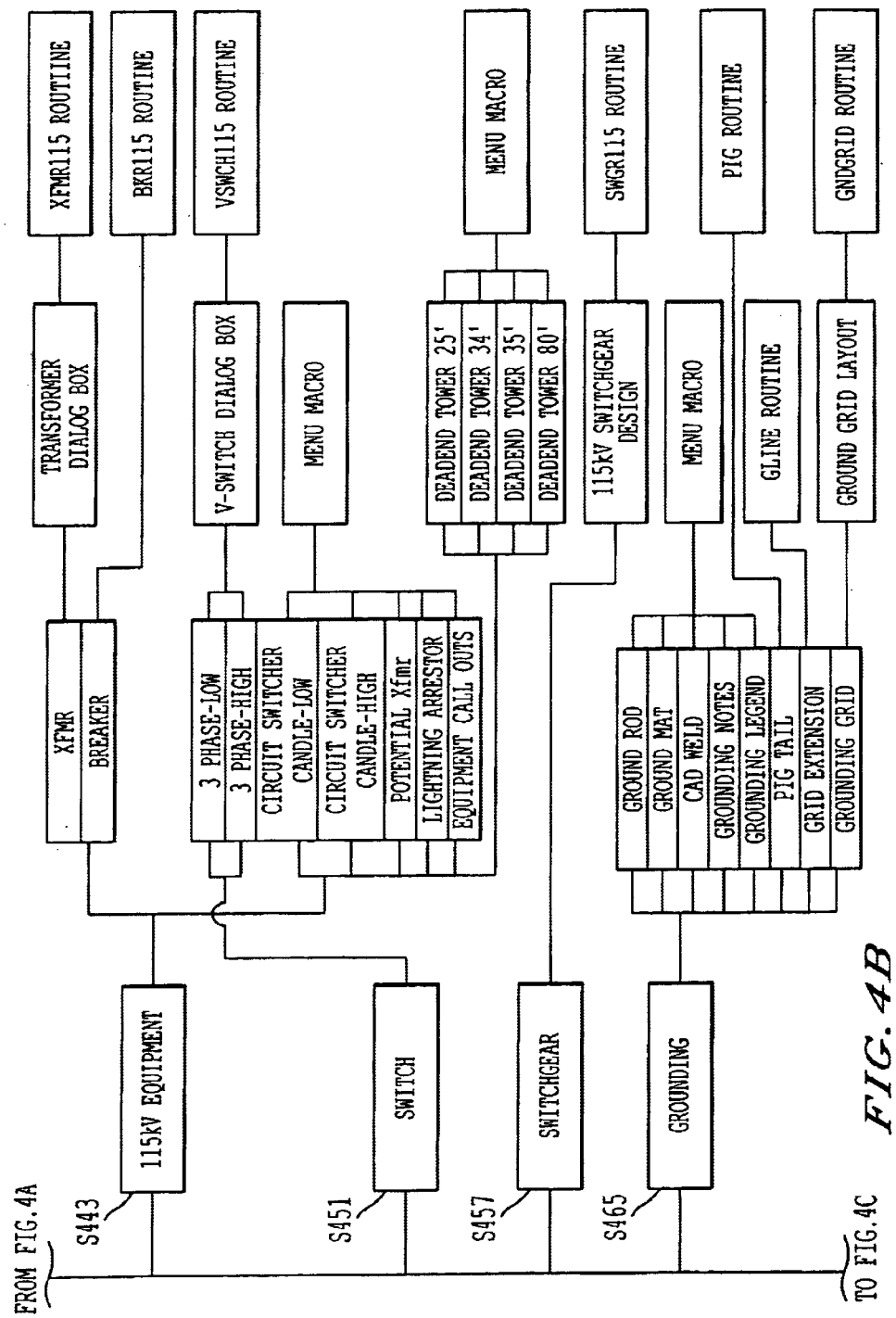
Figure 4C:
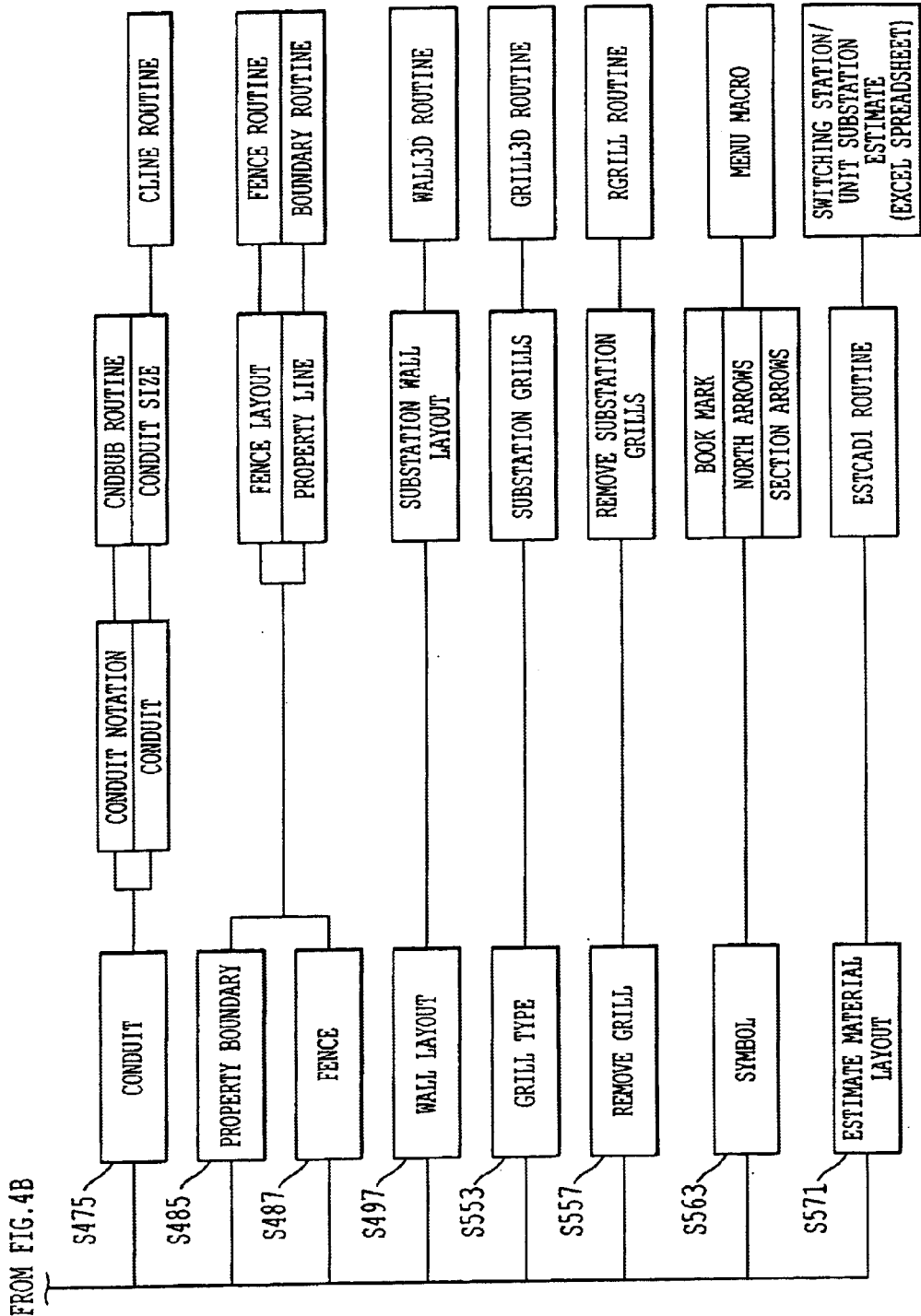
Figure 9:
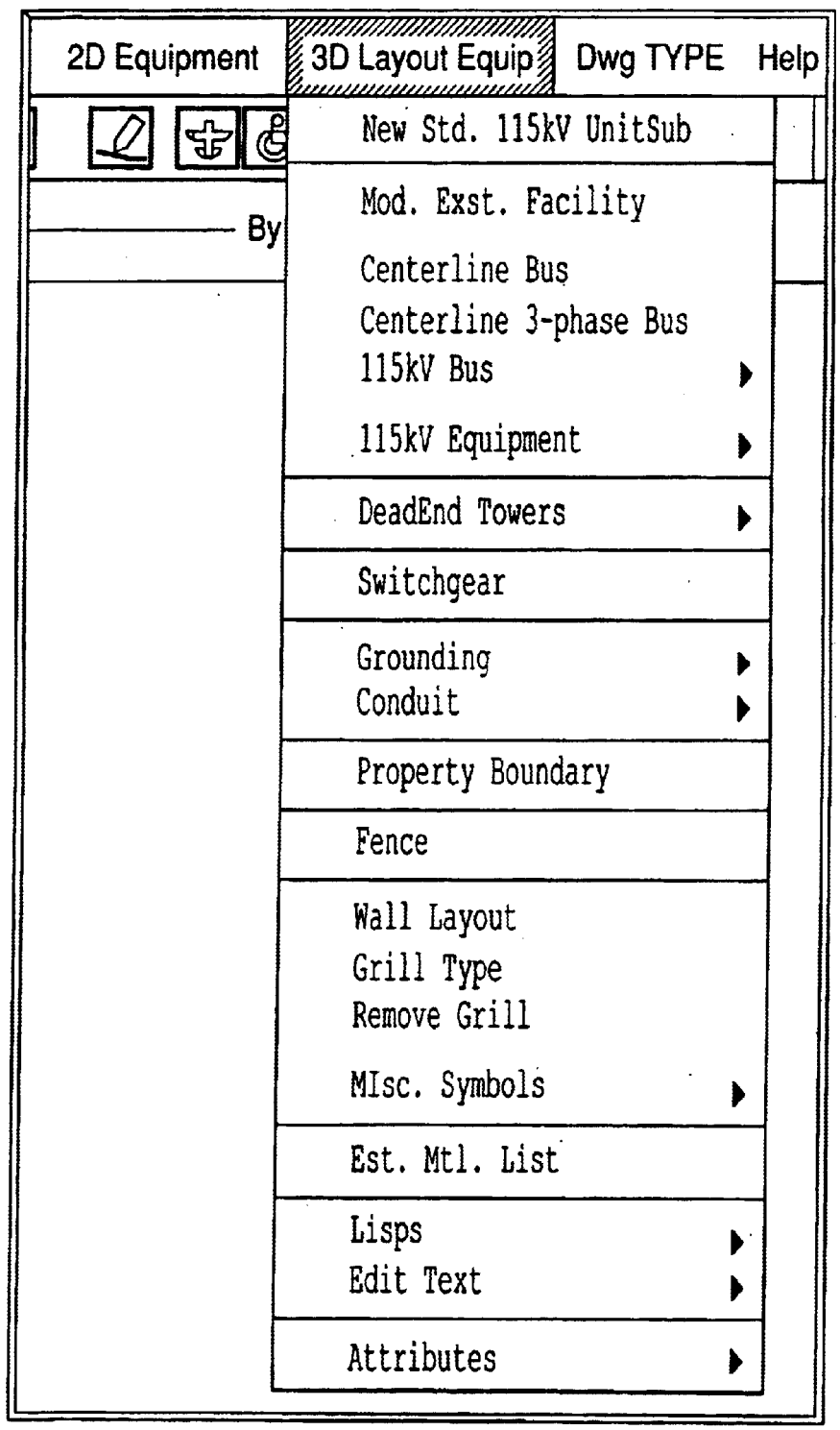
FIG. 9 is an example display of a pull down menu, showing various options made available to a user when determining whether to design a new station, or modify an existing substation.

FIGS. 4A–4C provide a logical flow diagram for the respective menus, macros and AutoLISP routines performed by the present invention. The respective boxes are color coded, as seen, indicating whether the respective steps in the process are pull-down menu items (dark blue), sub-menu items (lighter blue), menu macro operations (purple), dialog boxes (grey), AutoLISP routines (yellow shaded), or an EXCEL spreadsheet (yellow). The process begins in step S400 where the application is started and then the process proceeds to step S401 where a 3-D equipment layout/equipment pull-down menu is presented. An example of this pull-down menu is shown in FIG. 9. Respective steps S403, S413, S419, S423, S427, S443, S451, S457, S465, S475, S485, S487, S497, S553, S557, S563, and S571, are steps that are accessible by way of the pull-down menu presented in step S401. For clarity purposes, only selected steps in FIGS. 4A–4C are discussed herein, as it is believed that the logical process flow and labels provided on the respective labels as well as the arrows indicating the logical process flow for the process is clear.

The process proceeds from step S401 to step S403, when the user selects the menu item "New Standard 115 kV Unit Sub". Then, as previously discussed, the process proceeds to step S405, where the user is provided with a dialog box identifying the different items that may be selected by the engineer. At this point, the operator has the option of going directly into the estimate operation which is performed in step S409, that provides the dialog information that is extracted to a text file and provided to the EXCEL spreadsheet. On the other hand, if the process proceeds from S405 to step S407, the switch gear design dialog box is presented to the user, for component selection by the user. Subsequently, the unit substation routine S14 is performed, where as previously discussed with respect to FIG. 2, the substation is designed based on the standard templates and prestored symbols, which were identified by the user in the dialog boxes presented in steps S405 and S407.

In step S413, the operator indicates that the operator would like to modify an existing facility, and is presented with a dialog box in step S415, which receives input from the user, and provides that information to the estimate dialog information in step S409, and updates the information contained in the drawing set, in the exist routine S417.

Each of the remaining steps in FIGS. 4A–4C, follow a consistent pattern, where depending on the feature to be included in the drawing set, the operator simply selects one of the items from the 3-D sub-menu items listed on the left-hand side of FIGS. 4B and 4C. In each case, the process then performs a logical flow to other routines, selections, as well as dialog boxes, for identifying symbols associated with the particular feature to be included in the substation design, and then presented as part of a cohesive drawing package, as was the case with the complete design process previously discussed. As the features and labels of each of the other elements are believed to be clear to one of ordinary skill in the power engineering art, and particularly in the unit substation design art, further discussion of the information contained in FIGS. 4A–4C is not believed to be necessary, particularly when interpreted in light of the complete description provided herein.

Figure 5:
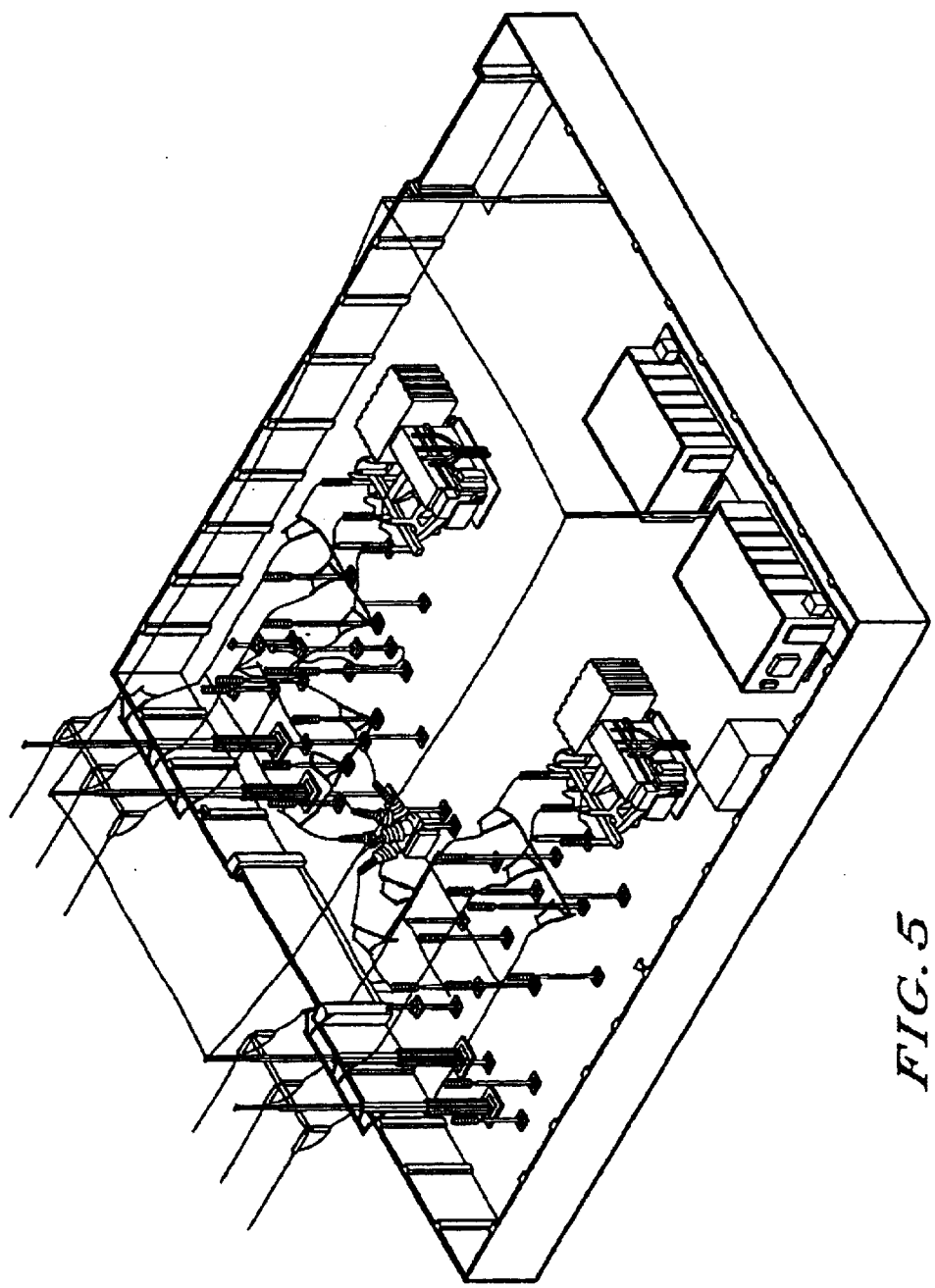
FIG. 5 is a perspective view of a 3-D rendering of a substation that may be designed from drawings produced with the present invention.
Figure 6:
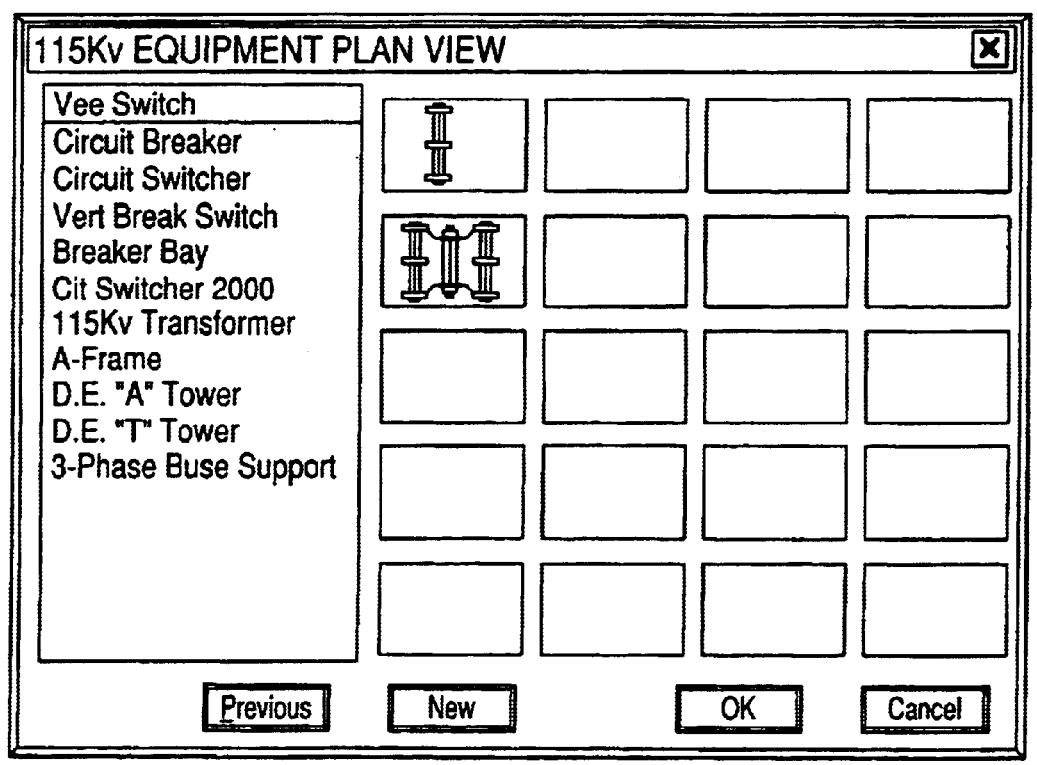
FIG. 6 is a graphical user interface, showing a library of user selectable "symbols" that may be incorporated into a substation being designed.
Figure 7:
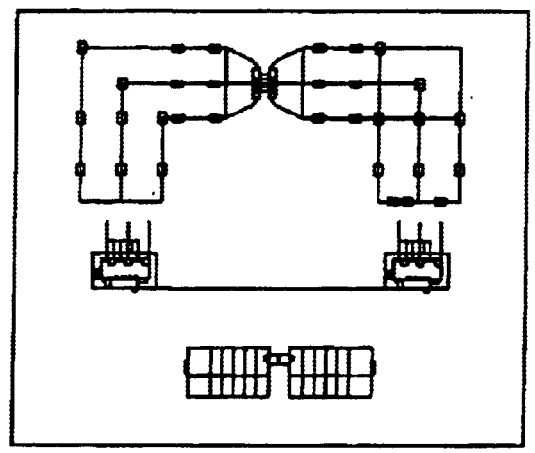
FIG. 7 is a plan view of components included in a unit substation being designed.
Figure 8:
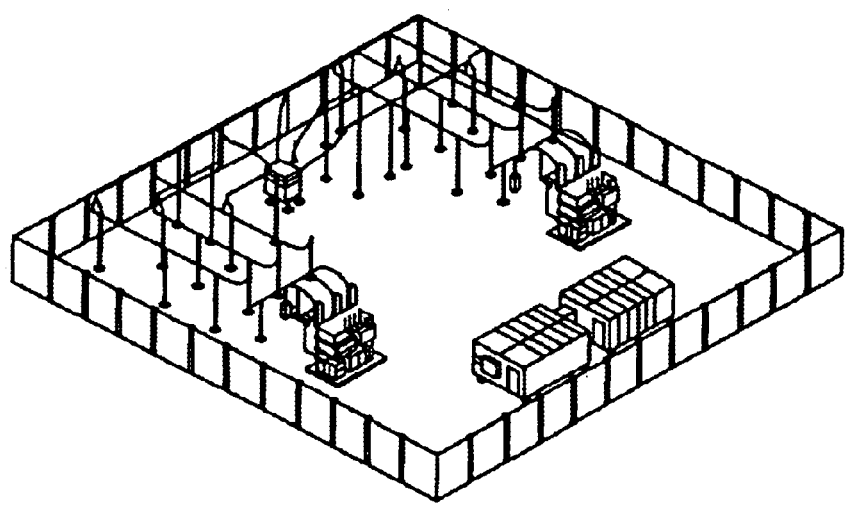
FIG. 8 is a perspective 3-D rendering of the station shown in FIG. 7.

FIG. 5 is a 3-D perspective view of what a typical substation may look like after being built from the construction drawings made with the system and method of the present invention. FIG. 6 shows examples of particular symbols, contained within the symbol library, as previously discussed. In a 3-D rendering of such a substation, according to the present invention, a plan view of similar structure is shown in FIG. 7. A perspective view of the substation shown in FIG. 7, is also shown in FIG. 8. For each of the system components shown in FIGS. 7 and 8, corresponding attributes for the components are used to form the materials list and cost estimate, as previously discussed. Furthermore, symbols for the respective components have been saved in the symbol library.

FIGS. 9 and 10A–10B have previously been discussed.

Figure 11:
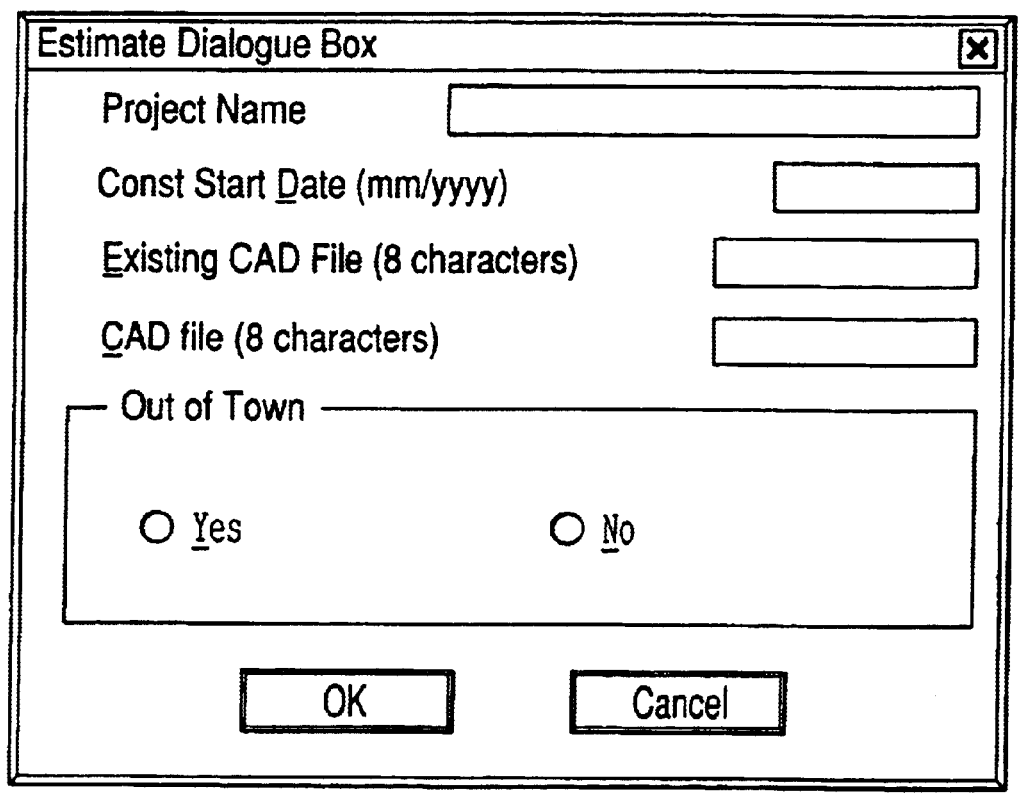
FIG. 11 is a display of a dialogue box, requesting information regarding a cost estimate and list of materials associated with the design of a substation.

FIG. 11 is an exemplary dialog box that would be presented to a user, prompting the user for information regarding the preparation of the materials list and cost estimate associated with the substation designed according to the present invention. A description of how the estimate program operates is provided on pages A-1 through A-38, which follow the Abstract. These pages are then followed by pages A-39 through A-44, which present supplemental information.

The processes set forth in the present description may be implemented using a conventional general purpose microprocessor programmed according to the teachings of the present specification, as will be appreciated to those skilled in the relevant art(s).

Appropriate software coding can be readily prepared by skilled programmers based on the teachings of the present disclosure, as will also be apparent to those skilled in the relevant arts.

The present invention thus also includes a computer-based product that may be hosted on a storage medium and include instructions that can be used to program a computer to perform a process in accordance with the present invention. The storage medium may include, but is not limited to, any type of disk including floppy disks, optical disks, CD-ROMs, magneto-optical disks, ROMs, RAMs, EPROMs, EEPROMs, flash memory, magnetic or optical cards, or any type of media suitable for storing electronic instructions.

Obviously, numerous modifications and various of the present are possible in light of the above teachings. It is therefore to be understood that within the scope of the appended claims, the invention may be practiced otherwise than as specifically described herein.

What is claimed is:

1. A computer-implemented electrical power substation design and cost estimation expert system, comprising:
   a first computer readable memory configured to hold data that defines symbols of electrical components for an electrical utility substation to be designed;
   a second computer readable memory configured to hold attributes associated with said symbols, at least one of said attributes for said symbols being cost information for including a predetermined electrical component as part of the electrical utility substation to be designed;
   a computer having
      a display, configured to present an indication of candidate electrical components available for selection for the electrical utility station to be designed, each indication being associated with a portion of said data that defines one of the symbols;
      a user interface, configured to enable a selection from an external source of said indication, and
      a processor configured to
         retrieve from the first computer readable memory the data that defines one of the symbols associated with the indication selected via said user interface,
         recognize the selection of at least one of a component of the facility and a design parameter for the facility, and based on said selection automatically define which of at least one of said plurality of symbols of the facility and design parameters are candidates for a subsequent selection,
         present the symbol on said display as a component of said electrical utility station to be designed,
         retrieve from said second computer readable memory preselected attributes associated with the symbol associated with the indication selected via the user interface, and
         collect said cost information from said preselected attributes in a file containing cost estimate information for said electrical utility station to be designed.

2. The computer-implemented electrical power substation design tool of claim 1, wherein:
   said attributes includes a description of equipment to be ordered for including a predetermined electrical component as part of the electrical utility substation to be designed;
   said preselected attributes include said description of equipment to be ordered; and
   said processor being configured to collect said description of equipment to be ordered in a file containing information for compiling a materials list for said electrical utility station to be designed.

3. The computer-implemented electrical power substation design tool of claim 2, wherein:
   said second computer readable memory holds said attributes in a MS ACCESS file format.

4. The computer-implemented electrical power substation design tool of claim 2, wherein:
   said file containing information for compiling a list of materials being in a MS ACCESS file format.

5. The computer-implemented electrical power substation design tool of claim 1, wherein:
   the file containing cost information being in a MS EXCEL format.

6. The computer-implemented electrical power substation design tool of claim 1, wherein:
   said processor is configured to present said symbol on said display as part of a plan view of said electrical utility station to be designed.

7. The computer-implemented electrical power substation of claim 1, (wherein:
   at least a portion of said electrical components are selected from a standard set of components.

8. The computer-implemented electrical power substation of claim 7, wherein:
   said standard set of components includes a 14 MVA transformer, a 22 MVA transformer, and a 33 MVA transformer.

9. The computer-implemented electrical power substation of claims 1, wherein:
   said user interface is configured to enable a selection from an external source of one of a predetermined set of substation templates, and
   said processor is configured to retrieve from memory a data file of a partially completed electrical power substation design, to which other symbols of electrical components are to be added to complete the electrical utility substation design.

10. The computer-implemented electrical power substation of claim 9, wherein:
    said predetermined set of substation templates includes
      a two-feeder station
      a three-feeder station
      a four-feeder station, and
      a station with a main breaker.

11. The computer-implemented electrical power substation of claim 9, wherein:
    said partially completed electrical power substation design includes a pre-existing substation design to be modified via a substitution of one or more components.

12. A computer-implemented electrical power substation design and materials list compilation expert system, comprising:
    a first computer readable memory configured to hold data that defines symbols of electrical components for an electrical utility substation to be designed;
    a second computer readable memory configured to hold attributes associated with said symbols, at least one of said attributes for said symbols includes a description of equipment to be ordered for including a predetermined electrical component as part of the electrical utility substation to be designed;

a computer having
    a display, configured to present an indication of candidate electrical components available for selection for the electrical utility station to be designed, each indication being associated with a portion of said data that defines one of the symbols;
    a user interface, configured to enable a selection from an external source of said indication, and
    a processor configured to
        retrieve from the first computer readable memory the data that defines one of the symbols associated with the indication selected via said user interface, present the symbol on said display as a component of said electrical utility station to be designed,
        retrieve from said second computer readable memory preselected attributes associated with the symbol associated with the indication selected via the user interface,
        recognize the selection of at least one of a component of the facility and a design parameter for the facility, and based on said selection automatically define which of at least one of said plurality of symbols of the facility and design parameters are candidates for a subsequent selection, and
        collect said description of said equipment from said preselected attributes in a file containing information for compiling a materials list for said electrical utility station to be designed.

13. The computer-implemented electrical power substation design tool of claim 12, wherein:
    said second computer readable memory holds said attributes in a MS ACCESS file format.

14. The computer-implemented electrical power substation design tool of claim 13, wherein:
    said file containing information for compiling a list of materials being in a MS ACCESS file format.

15. The computer-implemented electrical power substation design tool of claim 12, wherein:
    said processor is configured to present said symbol on said display as part of a plan view of said electrical utility station to be designed.

16. The computer-implemented electrical power substation of claim 12, wherein:
    at least a portion of said electrical components are selected from a standard set of components.

17. The computer-implemented electrical power substation of claim 16, wherein:
    said standard set of components includes a 14 MVA transformer, a 22 MVA transformer, and a 33 MVA transformer.

18. The computer-implemented electrical power substation of claim 12, wherein:
    said user interface is configured to enable a selection from an external source of one of a predetermined set of substation templates, and
    said processor is configured to retrieve from memory a data file of a partially completed electrical power substation design, to which other symbols of electrical components are to be added to complete the electrical utility substation design.

19. The computer-implemented electrical power substation of claim 18, wherein:
    said predetermined set of substation templates includes
        a two-feeder station
        a three-feeder station
        a four-feeder station, and
        a station with a main breaker.

20. The computer-implemented electrical power substation of claim 18, wherein:
    said partially completed electrical power substation design includes a pie-existing substation design to be modified via a substitution of one or more components.

21. A computer program product comprising a computer storage medium having a computer code mechanism embedded in the computer storage medium enabling an expert system for designing and performing cost estimations on electrical power substation designs, the computer program code mechanism configured to hold:
    data that defines symbols of electrical components for an electrical utility substation to be designed,
    attributes associated with said symbols, at least one of said attributes for said symbols being cost information for including a predetermined electrical component as part of the electrical utility substation to be designed, and
    computer readable instructions that when are executed by a processor implement
        a first presentation mechanism configured to provide to a display an indication of candidate electrical components available for selection for the electrical utility station to be designed, each indication being associated with a portion of said data that defines one of the symbols;
        a selection mechanism configured to enable a selection from an external source of said indication,
        a first retrieval mechanism configured to retrieve from memory the data that defines one of the symbols associated with the indication selected via said user interface,
        an association mechanism configured to recognize the selection of at least one of a component of the facility and a design parameter for the facility, and based on said selection automatically define which of at least one of said plurality of symbols of the facility and design parameters are candidates for a subsequent selection,
    a second presentation mechanism for providing to the display the symbol for display as a component of said electrical utility station to be designed,
    a second retrieval mechanism configured to retrieve from memory said preselected attributes associated with the symbol associated with the indication selection mechanism, and
    a collection mechanism configured to collect in a file said cost information from said preselected attributes containing cost estimate information for said electrical utility station to be designed.

22. The computer program product of claims 21, wherein:
    said attributes includes a description of equipment to be ordered for including a predetermined electrical component as part of the electrical utility substation to be designed;
    said preselected attributes include said description of equipment to be ordered; and
    said computer readable instructions further comprising another collection mechanism configured to collect said description of equipment to be ordered in a file containing information for compiling a materials list for said electrical utility station to be designed.

23. The computer program product of claim 22, wherein:
    said attributes are held in a MS ACCESS file format.

24. The computer program product of claim 22, wherein:
said file containing information for compiling a list of materials being in a MS ACCESS file format.

25. The computer program product of claim 21, wherein: the file containing cost information being in a MS EXCEL format.

26. The computer program product of claim 21, wherein: said second presentation mechanism is configured to present said symbol on said display as part of a plan view of said electrical utility station to be designed.

27. The computer program product of claim 21, wherein: at least a portion of said electrical components are selected from a standard set of components.

28. The computer program product of claim 27, wherein: said standard set of components includes a 14 MVA transformer, a 22 MVA transformer, and a 33 MVA transformer.

29. The computer program product of claim 21, wherein: said selection mechanism is configured to enable a selection from an external source of one of a predetermined set of substation templates, and
said first retrieval mechanism is configured to retrieve from memory a data file of a partially completed electrical power substation design, to which other symbols of electrical components are to be added to complete the electrical utility substation design.

30. The computer program product of claim 29, wherein: said predetermined set of substation templates includes
a two-feeder station
a three-feeder station
a four-feeder station, and
a station with a main breaker.

31. The computer program product of claim 29, wherein: said partially completed electrical power substation design includes a pre-existing substation design to be modified via a substitution of one or more components.

32. A computer program product comprising a computer storage medium having a computer code mechanism embedded in the computer storage medium enabling an expert system for designing and compiling a materials list on electrical power substation designs, the computer program code mechanism configured to hold:
data that defines symbols of electrical components for an electrical utility substation to be designed,
attributes associated with said symbols, at least one of said attributes for said symbols includes a description of equipment to be ordered for including a predetermined electrical component as part of the electrical utility substation to be designed, and
computer readable instructions that when are executed by a processor implement
a first presentation mechanism configured to provide to a display an indication of candidate electrical components available for selection for the electrical utility station to be designed, each indication being associated with a portion of said data that defines one of the symbols;
a selection mechanism configured to enable a selection from an external source of said indication,
a first retrieval mechanism configured to retrieve from memory the data that defines one of the symbols associated with the indication selected via said user interface,
an association mechanism configured to recognize the selection of at least one of a component of the facility and a design parameter for the facility, and based on said selection automatically define which of at least one of said plurality of symbols of the facility and design parameters are candidates for a subsequent selection,
a second presentation mechanism for providing to the display the symbol for display as a component of said electrical utility station to be designed,
a second retrieval mechanism configured to retrieve from memory said preselected attributes associated with the symbol associated with the indication selection mechanism, and
a collection mechanism configured to collect in a file said description of said equipment from said preselected attributes in a file containing information for compiling a materials list for said electrical utility station to be designed.

33. The computer program product according to claim 32, wherein:
said second computer readable memory holds said attributes in a MS ACCESS file format.

34. The computer program product according to claim 33, wherein: said file containing information for compiling a list of materials being in a MS ACCESS file format.

35. The computer program product according to claim 32, wherein:
said second presentation mechanism is configured to present said symbol on said display as part of a plan view of said electrical utility station to be designed.

36. The computer program product according to claim 32, wherein:
at least a portion of said electrical components are selected from a standard set of components.

37. The computer program product according to claim 36, wherein:
said standard set of components includes a 14 MVA transformer, a 22 MVA transformer, and a 33 MVA transformer.

38. The computer program product according to claim 32, wherein:
said selection mechanism is configured to enable a selection from an external source of one of a predetermined set of substation templates, and
said first retrieval mechanism is configured to retrieve from memory a data file of a partially completed electrical power substation design, to which other symbols of electrical components are to be added to complete the electrical utility substation design.

39. The computer program product according to claim 38, wherein:
said predetermined set of substation templates includes
a two-feeder station
a three-feeder station
a four-feeder station, and
a station with a main breaker.

40. The computer program product according to claim 38, wherein:
said partially completed electrical power substation design includes a pre-existing substation design to be modified via a substitution of one or more components.

41. A computer-implemented expert method for designing and preparing a cost estimate for an electrical power substation, comprising steps of:
holding in memory data that defines symbols of electrical components for an electrical utility substation to be designed;
holding in memory attributes associated with said symbols, at least one of said attributes for said symbols being cost information for including a predetermined electrical component as part of the electrical utility substation to be designed;
displaying an indication of candidate electrical components available for selection for the electrical utility station to be designed, each indication being associated with a portion of said data that defines one of the symbols;

selecting an indication corresponding with one of the candidate electrical components;

retrieving from memory the data that defines one of the symbols associated with the indication selected in said selecting step;

recognizing the selection of at least one of a component of the facility and a design parameter for the facility, and based on said selection automatically define which of at least one of said plurality of symbols of the facility and design parameters are candidates for a subsequent selection;

displaying the symbol as a component of said electrical utility station to be designed;

retrieve from memory preselected attributes associated with the symbol associated with the indication selected in said selecting step, and collecting said cost information from said preselected attributes in a cost file containing cost estimate information for said electrical utility station to be designed.

42. The method of claim 41, further comprising a step of:

compiling in a materials file a list of materials to be ordered based on components selected in said selecting step and other selecting steps, wherein said attributes includes a description of equipment to be ordered for including a predetermined electrical component as part of the electrical utility substation to be designed, and said preselected attributes include said description of equipment to be ordered.

43. The method of claim 42, wherein:

said compiling step includes compiling said materials file in a MS ACCESS file format.

44. The method of claim 41, wherein:

the collecting step includes forming the cost file in a MS EXCEL format.

45. The method of claim 41, wherein:

said displaying step includes displaying said symbol as part of a plan view of said electrical utility station to be designed.

46. The method of claim 41, wherein:

said selecting step includes selecting at least a portion of said electrical components from a standard set of components.

47. The method of claim 46, wherein:

said standard set of components includes a 14 MVA transformer, a 22 MVA transformer, and a 33 MVA transformer.

48. The method of claim 41, further comprising steps of:

selecting a template of a predetermined set of substation templates; and retrieving from memory a data file of a partially completed electrical power substation design, and adding other symbols of electrical components to complete the electrical utility substation design.

49. The method of claim 48, wherein:

said predetermined set of substation templates includes
a two-feeder station
a three-feeder station
a four-feeder station, and
a station with a main breaker.

50. The method of claim 48, wherein:

said adding step includes substitution of one or more electrical components.

51. A computer-implemented expert method for designing and preparing a materials list for an electrical power substation, comprising steps of:

holding in memory data that defines symbols of electrical components for an electrical utility substation to be designed;

holding in memory attributes associated with said symbols, at least one of said attributes for said symbols includes a description of equipment to be ordered for including a predetermined electrical component as part of the electrical utility substation to be designed;

displaying an indication of candidate electrical components available for selection for the electrical utility station to be designed, each indication being associated with a portion of said data that defines one of the symbols;

selecting an indication corresponding with one of the candidate electrical components;

retrieving from memory the data that defines one of the symbols associated with the indication selected in said selecting step;

recognizing the selection of at least one of a component of the facility and a design parameter for the facility, and based on said selection automatically define which of at least one of said plurality of symbols of the facility and design parameters are candidates for a subsequent selection;

displaying the symbol as a component of said electrical utility station to be designed;

retrieve from memory preselected attributes associated with the symbol associated with the indication selected in said selecting step, and collecting said description of said equipment from said preselected attributes in a materials file containing information to form a list of materials for components used in said electrical utility station to be designed.

52. The method of claim 51, wherein:

said collecting step includes forming said materials file in a MS ACCESS file format.

53. The method of claim 51, wherein:

said displaying step includes displaying said symbol as part of a plan view of said electrical utility station to be designed.

54. The method of claim 51, wherein:

said selecting step includes selecting at least a portion of said electrical components from a standard set of components.

55. The method of claims 54, wherein:

said standard set of components includes a 14 MVA transformer, a 22MVA transformer, and a 33 MVA transformer.

56. The method of claim 51, further comprising steps of:

selecting a template of a predetermined set of substation templates; and retrieving from memory a data file of a partially completed electrical power substation design, and adding other symbols of electrical components to complete the electrical utility substation design.

57. The method of claim 56, wherein:

said predetermined set of substation templates includes
a two-feeder station
a three-feeder station
a four-feeder station, and
a station with a main breaker.

58. The method of claim 56, wherein:

said adding step includes substitution of one or more electrical components.

* * * * *

UNITED STATES PATENT AND TRADEMARK OFFICE
CERTIFICATE OF CORRECTION

PATENT NO. : 6,895,373 B2
DATED : May 17, 2005
INVENTOR(S) : Gathen Garcia et al.

It is certified that error appears in the above-identified patent and that said Letters Patent is hereby corrected as shown below:

Column 12,
Line 25, change "(wherein:" to -- wherein: --.

Column 14,
Line 4, change "pie-" to -- pre- --.

Signed and Sealed this

Twenty-eighth Day of March, 2006

JON W. DUDAS
*Director of the United States Patent and Trademark Office*